United States Patent
Van Blokland

(10) Patent No.: US 11,882,841 B2
(45) Date of Patent: Jan. 30, 2024

(54) DOUGH PIECE ROLLED UP WITH A SEPARATOR SHEET, AND METHOD AND DEVICE FOR PREPARING THESE

(71) Applicant: Radie B.V., Culemborg (NL)

(72) Inventor: Johannes Josephus Antonius Van Blokland, Culemborg (NL)

(73) Assignee: RADIE B.V., Culemborg (NL)

( * ) Notice: Subject to any disclaimer, the term of this patent is extended or adjusted under 35 U.S.C. 154(b) by 0 days.

(21) Appl. No.: 17/707,468

(22) Filed: Mar. 29, 2022

(65) Prior Publication Data
US 2022/0322683 A1 Oct. 13, 2022

(30) Foreign Application Priority Data
Apr. 9, 2021 (EP) ..................................... 21167724

(51) Int. Cl.
*A21C 3/06* (2006.01)
(52) U.S. Cl.
CPC ...................................... *A21C 3/06* (2013.01)
(58) Field of Classification Search
CPC .................................. A21C 3/06; A21C 9/063
USPC ......................................................... 425/549
See application file for complete search history.

(56) References Cited

U.S. PATENT DOCUMENTS

| | | | | |
|---|---|---|---|---|
| 2,706,043 A * | 4/1955 | Rhodes | ..................... | A21C 3/06 425/363 |
| 3,863,422 A * | 2/1975 | Wagner | .................. | A21C 9/081 53/493 |
| 4,666,391 A * | 5/1987 | Watt | ........................ | B65B 25/06 425/122 |
| 2012/0308693 A1* | 12/2012 | Van Blokland | .......... | A21C 3/06 426/501 |
| 2014/0047984 A1* | 2/2014 | Lin | ........................ | A21C 11/22 99/450.1 |

FOREIGN PATENT DOCUMENTS

| | | | |
|---|---|---|---|
| DE | 102018004351 B3 * | 4/2019 | |
| DE | 102019104857 A1 * | 8/2020 | |
| EP | 2529629 A1 | 12/2012 | |

OTHER PUBLICATIONS

Machine English translation of DE-102018004351B3; retrieved from https://translationportal.epo.org/emtp/translate/?ACTION=description-retrieval&COUNTRY=DE&ENGINE=google&FORMAT=docdb&KIND=B3&LOCALE=en_EP&NUMBER=102018004351&SRCLANG=de&TRGLANG=en (Year: 2018).*
Schafer H NPL (DE-102019104857-A1) Translation (Year: 2019).*

* cited by examiner

*Primary Examiner* — Francisco W Tschen
*Assistant Examiner* — Edgaredmanuel Troche
(74) *Attorney, Agent, or Firm* — The Dobrusin Law Firm, P.C.

(57) ABSTRACT

Device for rolling up a dough piece on a separator sheet, comprising a rolling chamber for receiving a flat sheet with a dough piece on top, and configured for rolling up the separator sheet and the dough piece, wherein the chamber comprises a controllable release opening for controlled transfer of the rolled up sheet with the dough piece to a receptacle and at least one sensor for determining directly or indirectly a closure position and/or end of the separator sheet and providing a signal representing said position, a controller for controlling the controllable release opening based on the signal from the sensor; and the receptacle for receiving the dough sheet being configured for holding the dough piece in a predetermined position.

20 Claims, 4 Drawing Sheets

DOUGH PIECE ROLLED UP WITH A SEPARATOR SHEET, AND METHOD AND DEVICE FOR PREPARING THESE

The present invention relates to a dough piece rolled up with separator sheet, and a method and device for preparing these.

Dough pieces rolled up with a separator sheet (for instance bakery paper or a foil) are used as a basis for home made pizzas and like products. A roll of a dough piece in a separator sheet is a compact way of storing, packaging and selling the dough, and it has the advantage that the dough is covered with paper on both sides, so that it does not stick together and stays fresh longer than a flat dough piece with only one paper, or even without paper. In order to use the prepared product, the paper is unrolled, and—in case of a pizza—provided with a topping, to be baked on the separator sheet afterwards. When a foil is used, the dough may be baked without the separator sheet.

Dough pieces rolled up with separator sheet are known in general, and so are methods and devices to prepare them. A fine working example is disclosed in the European Patent EP2529629. This device converts a flat dough sheet on a separator sheet into a rolled up dough piece and delivers it to an output conveyor belt. From there on it may be handled further, and in particular, a packaging stage may follow, in which the dough piece and the separator sheet are for instance wrapped in a plastic foil and may be boxed for sales to end consumers. Before being wrapped, the end of the separator sheet may be glued, to fixate the roll. However, this glue application process may not always be desired, and the amount of glue has appeared to be critical. When an insufficient amount of glue is applied, the end of the separator sheet may loosen, while a superfluous amount of glue may cause deterioration of machinery and may cause the separator sheet to stick to further wrapping such as plastics or a box.

For that latter purpose it has appeared that the exact rotational orientation of the rolled up dough sheet and separator sheet are important to be known. It is a goal of the present invention to propose an improved device for rolling up a dough piece that fulfils the above described need.

The invention thereto proposes a device for rolling up a dough piece on a separator sheet, comprising a rolling chamber for receiving a flat sheet with a dough piece on top, and configured for rolling up the separator sheet and the dough piece, wherein the chamber comprises a controllable release opening for controlled transfer of the rolled up sheet with the dough piece to a receptacle, characterized by at least one sensor for determining a closure position of the separate sheet and providing a signal representing the position, a controller for controlling the controllable release opening based on the signal from the sensor, and the receptacle for receiving the dough sheet being configured for holding the dough piece in a predetermined position.

By determining the closure position of the separate sheet, being the angular position where the end of the separator sheet is, the moment for opening the rolling chamber can be determined exactly. Together with a known transfer distance to the receptacle, in combination with the receptacle being configured to holding the dough piece in a predetermined position, the exact orientation of the dough piece and in particular the end of the separator sheet once transferred is known. This information can be used during further handling of the separator sheet with the dough piece.

In an embodiment, the receptacle is configured for limiting movement of the rolled up dough sheet in the rolling direction, in particular by being configured for supporting the dough sheet at at least one location different from its lowmost point. This may for instance comprise one or more side boards or notches. The receptacle may evidently also support the separator sheet and the dough piece at their lowmost point. Such side board or notch may also be applied to limit a movement of the rolled up separator sheet and dough piece.

In a further embodiment, the receptacle is a gutter. With a gutter, a shape with a more or less concave cross section of its surface is meant, having centring properties due to its shape.

In a yet further embodiment, the receptacle is configured for transferring the rolled up dough sheet in a direction parallel to its axis of rotation during rolling. This normally means that the rolled up separator sheet with the dough piece in a sideward direction. This enables the construction of a compact dough line, and in particular to position a packaging and/or wrapping station next to the dough line. This construction further enables to arrange multiple rolled up separator sheets with dough pieces that are rolled up simultaneously, to be wrapped or packaged subsequently.

In a preferred embodiment, the receptacle comprises a conveyor belt for moving the rolled up dough sheet in the direction parallel to its axis of rotation during rolling.

The device according to the invention may be coupled to, or comprise a further packaging station, wherein the rolled up separator sheet and dough piece are further wrapped in plastics and/or boxed.

Although not necessary for all applications, the device according to the invention may further comprise means for applying a stroke of glue to the separator sheet prior to further packaging. This may be done in the rolling chamber or afterwards. Alternatively, the separator sheet may be provided with a glue up front, that is, prior to being rolled up.

In a further embodiment, the receptacle comprises lifting means such as a guide plate for lifting a loose end of the separator sheet to a predetermined orientation.

The device may further comprise a second sensor for determining the completion of the rolling up of the separator sheet and the dough sheet and to provide a signal indicating the completion of the rolling up of the dough sheet and the separator sheet.

The controller may be configured to control the release opening based on a signal from the first and the second conveyor.

In yet a further embodiment, the device according to the invention, may be configured to reroute a rejected separator sheet with or without a dough piece to another destination than approved separator sheets with dough pieces.

In particular the receptacle may be configured to discharge a rejected separator sheet with or without a dough piece. This may be done by directing the dough piece to a bin or the like, for instance by lifting the receptacle when a separator sheet with or without a dough piece to be rejected is expected. In another embodiment, such separator sheet with or without a dough piece may be transferred in a direction parallel to its axis of rotation during rolling, but opposite to a direction in which approved separator sheets with dough pieces are transferred.

The method and means for rolling up the separator dough sheet and the dough piece as such and the general construction of the rolling chamber may be identical to those described in European Patent EP2529629. The invention may be thus configured to apply a method for supplying a dough piece rolled up with a separator sheet, comprising the steps of supplying in a transport direction, a dough piece positioned on a separator sheet, the dough piece and the separator sheet having a length and a width, wherein a leading edge of the separator sheet exceeds the dough piece at at least a first side, rolling up the at least one side of the dough paper that exceeds the dough piece, thus forming a cylinder of separator sheet, extending in a width direction of the dough piece, and rolling up the rest of the separator sheet with the dough piece around the cylinder.

By forming a cylinder of separator sheet first has several advantages. Firstly, when cutting the paper in pieces, straight edges are formed. These edges simplify the formation of a straight roll, which is advantageous when mechanically handling the rolled dough. As a result, the invention thus provides with the possibility to roll up dough pieces with various forms, e.g. square, rectangular, triangular, round, hexagonal, etc.

In comparison with the state of the art, wherein a strip of the leading edge of the separator sheet is fold over the dough piece prior to rolling, the not necessarily straight leading edge of the dough piece lead to obliquely rolled dough pieces.

A further advantage hereof is that the initially formed paper roll provides the final result a desired flexural strength. During production, this flexural strength already offers the advantage that no additional support is required. Such a support may normally be formed by one or more cylindrical parts that are retracted coaxially with the roll after the latter had been rolled up. However, coaxial retraction of such parts requires an extra handling step, and it also requires more width in production environment, which are both considered disadvantageous.

The leading edge of the separator sheet needs to exceed the dough piece at least such an amount, that at least one turn can be made. When more sturdiness is required, two or more turns may be made. For a dough roll with a diameter of 1 cm, this means that about 3 to 6 cm of leading paper is required (dependent on the number of turns).

According to the invention, rolling the dough and the separator sheet is performed by means of at least three conveyors, each turning the at least one dough piece on separator sheet essentially 90 degrees with respect to the transport direction of the dough. The conveyors form a rolling chamber that forces the paper to turn three quarters round, to encounter itself and to form a roll.

A further advantage is that the roll is formed during transport of the separator sheet and the dough piece. Since the axis of rotation of the dough piece is perpendicular to the transport direction of the separator sheet with the dough piece, the method is suitable for uninterruptedly handling a plurality of dough pieces, uninterruptedly meaning here that the transport of separator sheet with dough pieces does not require to be stopped during rolling, which makes the manufacturing process faster. The method according to the invention therefor also comprises uninterruptedly supplying, rolling and carrying off a multiple dough pieces in the transport direction.

The invention further relates to a device for manufacturing a dough piece rolled up with separator sheet as described above and/or claimed later on, comprising a supplier for supplying in a transport direction of dough pieces on separator sheet, the dough pieces having a length in the transport direction of and a width perpendicular to the transport direction, a rolling chamber, contiguous to the supplier in the transport direction, defined by at least a subsequent first, a second and a third endless conveyor, each having a direction of conveyance perpendicular to the direction of conveyance of a previous conveyor, and the transport direction respectively, and together configured for leading an item supplied to the rolling chamber around, such that it encounters itself again.

As explained above, the leading strip of paper puts different requirements to a device for forming the rolls.

In the present invention, this problem is overcome by providing at least three endless conveyors, each having a direction of conveyance perpendicular to the direction of conveyance of a previous conveyor. With "direction of conveyance", reference is made here to the surface direction of the endless conveyor at the point where it encounters the separator sheet and later on the separator sheet with the dough piece.

For clarity reasons, in the following, the length of the dough is in the transport direction, and the width perpendicular thereto. The transport takes place essentially in a horizontal plane, although this may be inclined, and in particular be sloped towards the rolling chamber defined by the at least three endless conveyors. In practice, a slope of 20 to 45 degrees, and in particular about 30 degrees may be applied. The width of the dough is in the same horizontal plane, perpendicular to the length.

An endless conveyor can have an essentially annular outline, such as a wheel, or a cylinder, or it may be formed by means of a string or a band or belt. In an embodiment, the first endless transporter comprises a number of wheels, arranged mutually spaced in a width direction, and rotatable on a common axis of rotation in a width direction.

The wheels are arranged movable in a direction perpendicular to the transport direction and the width of the dough. This direction will be referred to as the height direction, although it may be inclined when the transport direction is sloping with respect to the horizontal. The choice for a number of wheels instead of—for example one cylinder—is especially advantageous when the second endless conveyor comprises a number of endless strings or belts, arranged mutually spaced in a width direction, at positions that fall in between the positions of the wheels. The endless strings are then led through the recesses between the wheels. This way, a "closed" chamber can be made, where the paper cannot escape between two conveyors.

Accordingly, the third transporter may comprise a number of endless strings or belts, arranged mutually spaced in a width direction, at positions that fall in between the positions of the endless strings or belts of the second conveyor. Again, the endless strings or belts of the third conveyor may be led through the open spaces between the belts or strings of the second converter.

The supplier may in general comprise an endless belt, which may in particular be equipped with a perforated cylinder, wherein along at least at a part of the mantle of the cylinder, a vacuum is applicable, and wherein at an edge of the part in a downstream transport direction, a scraper is provided, for scraping the leading edge of the paper from the perforated cylinder.

Such a cylinder is placed at the end of the supplier, preceded by means for forming separate dough pieces on separated sheets of separator sheet. The vacuum can be applied to stick the paper to the roll, for leasing it to the first conveyer in a controlled manner.

When rolling up separator sheet with dough pieces, the diameter of the roll increases. For allowing this increase to take place, the mutual position of at least two of the conveyors is preferably displaceable, so that the rolling chamber increases along during rolling up a dough piece with separator sheet. This increase me be done in a controlled manner, based on a predetermined or precalculated increase of the roll, so that the chamber does not limit the dough while being rolled.

The supplier may be configured such that it provides dough pieces positioned on separator sheets, with the leading edge of the separator sheet exceeds the dough piece at the first side such that it can be rolled at least one turn, before the dough piece reaches the rolling chamber. The device may further comprise an adhesive-dispenser, for dispensing adhesive on an exceeding edge of the baking paper lagging the dough piece in a transport direction.

The invention also relates to a dough piece rolled up with separator sheet, comprising a cylinder of separator sheet, along which dough piece with the separator sheet is wound further. In an embodiment, the cylinder of separator sheet forms one piece with the separator sheet of which the roll is further made. The edge of the separator sheet at the outside of the roll may herein be fixed to the roll by means of an adhesive.

The invention will now be elucidated into more detail with reference to the following figures. Herein:

Figure 1:
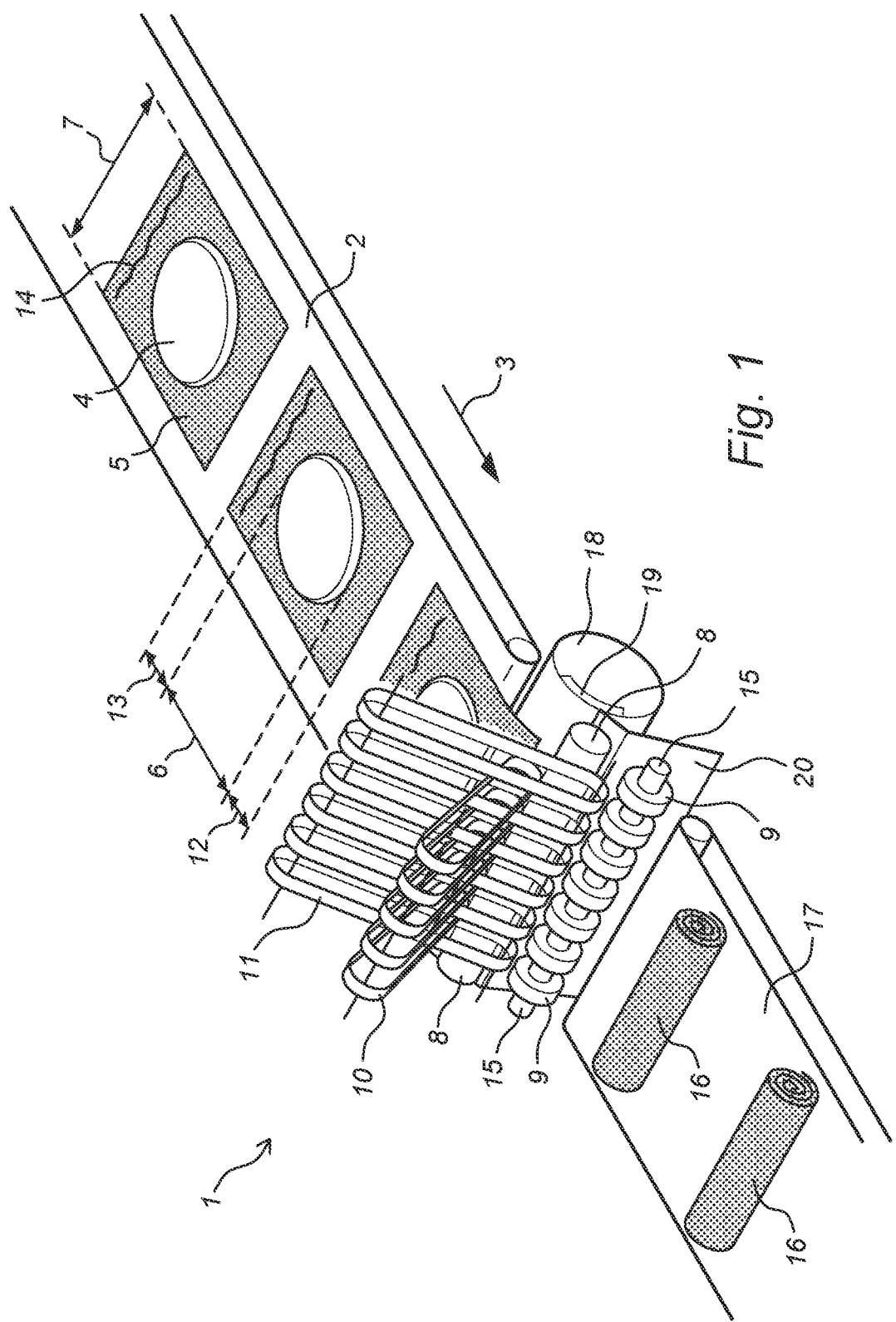
FIG. 1 shows a schematic perspective view of a device according to the state of the art.

FIG. 1 shows a device 1 for preparing a dough piece rolled up with separator sheet, comprising a supplier 2 for supplying in a transport direction 3 of dough pieces 4 on separator sheet 5, the dough pieces 4 having a length 6 in the transport direction and a width 7 perpendicular to the transport direction. The device 1 comprises a rolling chamber 8, contiguous to the supplier 2 in the transport direction, defined by at least a subsequent first conveyor 9, a second conveyor 10, and a third endless conveyor 11. The interaction of the first, second and third conveyor will be explained later on into more detail in the next figure. In FIG. 1 it is visible that the separator sheets 5 extend the length of the dough pieces 4 at their leading edges, with respect to the direction of movement 3. The extending strip 12 of separator sheet is first led into the rolling chamber, to form a paper roll. Afterwards the dough is rolled along, and finally, a lagging stroke 13 of the separator sheet is rolled up. In order to fix the thus formed roll, the lagging stroke 13 is provided with adhesive 14, which may be applied in a strip or in separate dots.

In FIG. 1, it is visible that the first endless conveyor 9 comprises a number of wheels, arranged mutually spaced in a width direction, and rotatable on a common axis of rotation 15 in a width direction. The second endless conveyor 10 comprises a number of endless strings or belts, arranged mutually spaced in a width direction, at positions that fall in between the positions of the wheels of the first endless conveyor 9, and the third transporter 11 comprises a number of endless strings or belts, arranged mutually spaced in a width direction, at positions that fall in between the positions of the endless strings or belts of the second conveyor 10. This way, in motion, a chamber is formed, with "moving walls" that curl up the separator sheet to a cylinder. After being curled up, the rolls 16 of separator sheets 4 with dough pieces 6 are fed away by a transporter 17.

Figure 2:
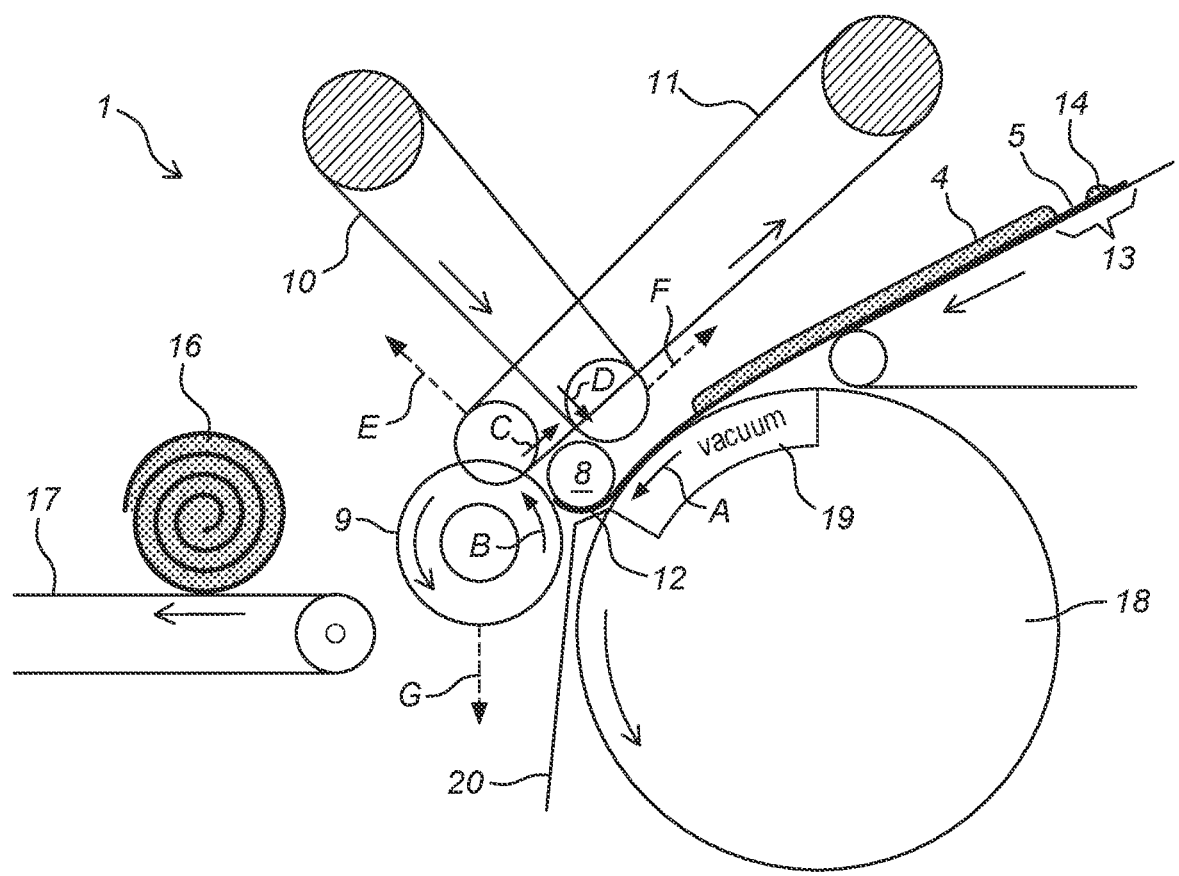
FIG. 2 shows a detailed side view of a device according to the state of the art.

FIG. 2 shows a detailed side view of the device 1 from FIG. 1. In FIG. 2 it is visible, that a leading strip 12 of the separator sheet 5, encounters three endless conveyors 9, 10, 11, each having a direction of conveyance B, C, D perpendicular to the direction of conveyance of a previous conveyor, and the transport direction A respectively, and together configured for leading an item supplied to the rolling chamber around, such that it encounters itself again.

It is also visible that the working surfaces of the conveyors 9, 10, 11, being the locations where interaction with the separator sheet (and indirectly the dough) takes place, have intersecting planes, and thus form a closed chamber. This is the reason that the first endless conveyor 9 is formed by a number of wheels (which may be provided with rubber or the like for increasing friction, and the second endless conveyor 10 comprises a number of endless strings or belts, arranged mutually spaced in a width direction, at positions that fall in between the positions of the wheels of the first conveyor 9. The third conveyor 11 comprises a number of endless strings or belts, arranged mutually spaced in a width direction, at positions that fall in between the positions of the endless strings or belts of the second conveyor 10.

During the rolling of a separator sheet 4 with a dough piece 5, the second conveyor 10 is moved in the direction E, and the third conveyor 11 is moved in the direction F, in order to increase the volume of the rolling chamber 8.

The supplier 2 comprises a perforated cylinder 18, wherein along at least at a part 19 of the mantle of the cylinder, a vacuum is applicable, and wherein at an edge of the part in a downstream transport direction, a scraper 20 is provided, for scraping the leading edge of the paper from the perforated cylinder 18.

When a roll 16 is finished within the rolling chamber, the first conveyor 9 is moved in the direction G, for opening the chamber and transferring the roll to a transporter 17. Afterwards, all conveyors are brought back to their initial positions for starting a new cyclus.

Figure 3:
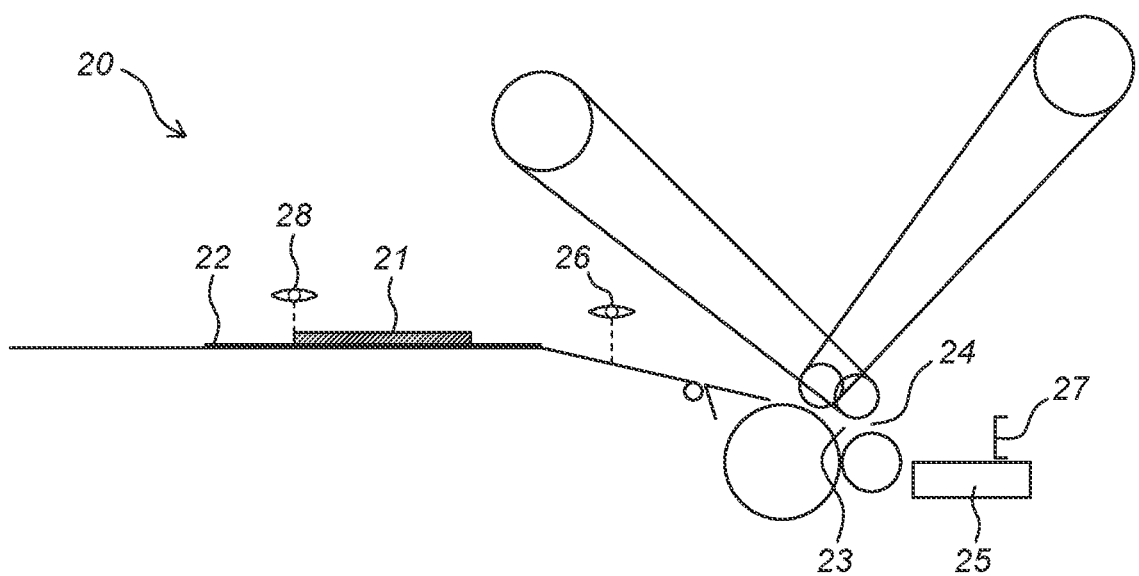
FIG. 3 shows a schematic view of a device according to the invention.

FIG. 3 shows a schematic view of a device 20 for rolling up a dough piece 21 on a separator sheet 22, comprising a rolling chamber 23 for receiving a flat sheet 22 with a dough piece 21 on top, and configured for rolling up the separator sheet 22 and the dough piece 21 wherein the chamber 23 comprises a controllable release opening 24 for controlled transfer of the rolled up sheet 22 with the dough piece 21 to a receptacle 25 and a sensor 26 for determining a closure position of the separator sheet 22 and providing a signal representing the position, and a controller (not shown) for controlling the controllable release opening based on the signal from the sensor 26 and the receptacle 25 for receiving the dough sheet being configured for holding the dough piece in a predetermined position supporting the dough sheet at at least one location different from its lowmost point, by means of an adjustable support location 27. The device comprises a second sensor 28 for determining the completion of the rolling up of the separator sheet and the dough sheet and to provide a signal indicating the completion of the rolling up of the dough sheet and the separator sheet. The second sensor determines the arrival of a dough piece and can also determine its length, by detecting the end said dough piece. Based on the detected start, the rolling chamber is controlled, in particular the speed in which it increases. Knowing the length of the dough piece (either because it is constant, or because it is measured), it is also known when the rolling is finished. The first sensor detects the end of the separator sheet, and based on known distances to the rolling chamber from that moment its position is known.

Figure 4:
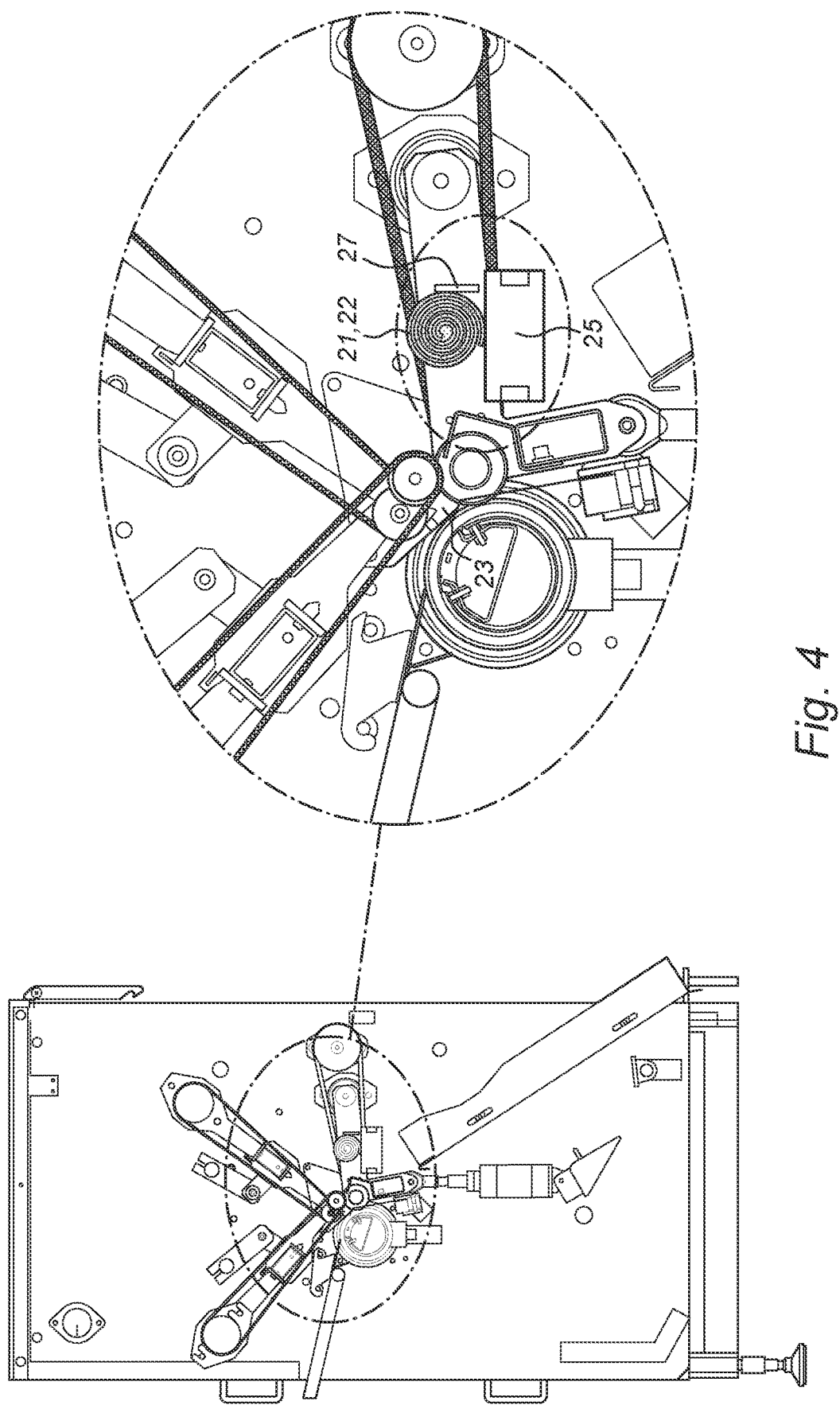
FIG. 4 shows a detailed side view of a device according to the invention.

FIG. 4 shows a detailed view of the same device 20 from FIG. 3. Like reference numbers indicate like parts as in FIG. 3. It is visible that the receptacle 25 is configured for transferring the rolled up dough sheet 21 in a direction parallel to its axis of rotation during rolling and thereto comprises a conveyor belt for moving the rolled up dough sheet in the direction parallel to its axis of rotation, that is into or from the plane of the figure.

Figure 5:
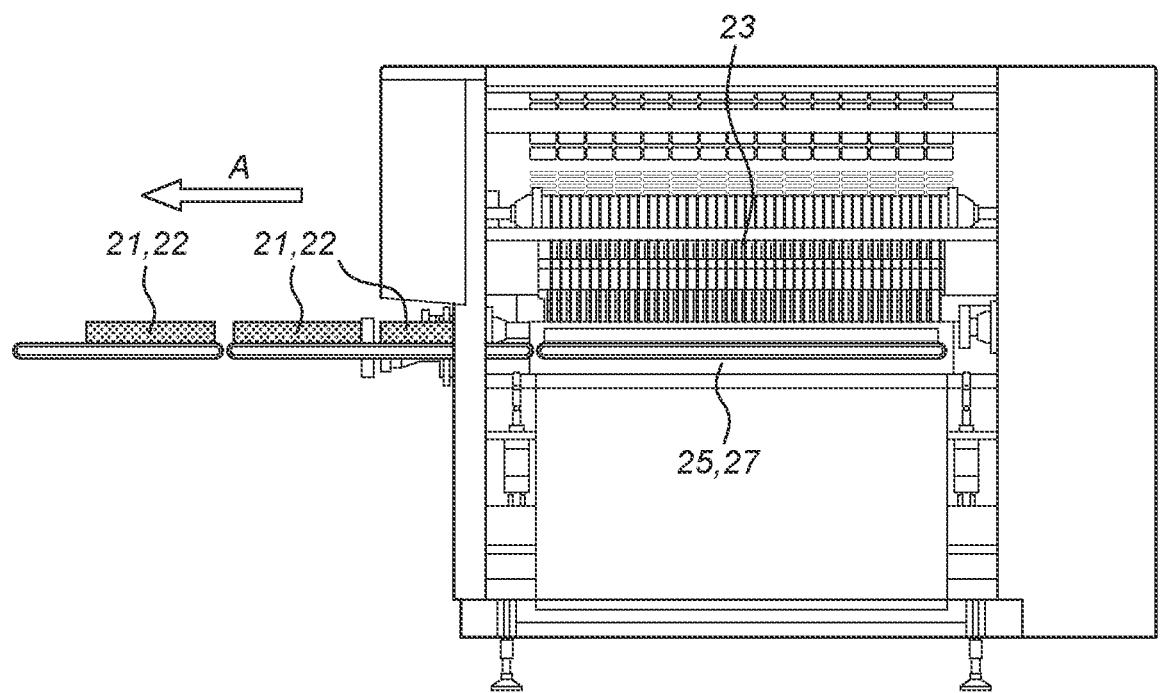
FIG. 5 shows a first detailed front view of a device according to the invention.

FIG. 5 shows a first detailed front view of a device according to the invention. Again, like reference numbers indicate like parts. Here, it is clearly visible that the rolled up separator sheets and dough pieces are transported in a direction A parallel to their axis of rotation during rolling. The receptacle 25 may however be configured to reroute a rejected separator sheet with or without a dough piece to another destination than approved separator sheets with dough pieces.

Figure 6:
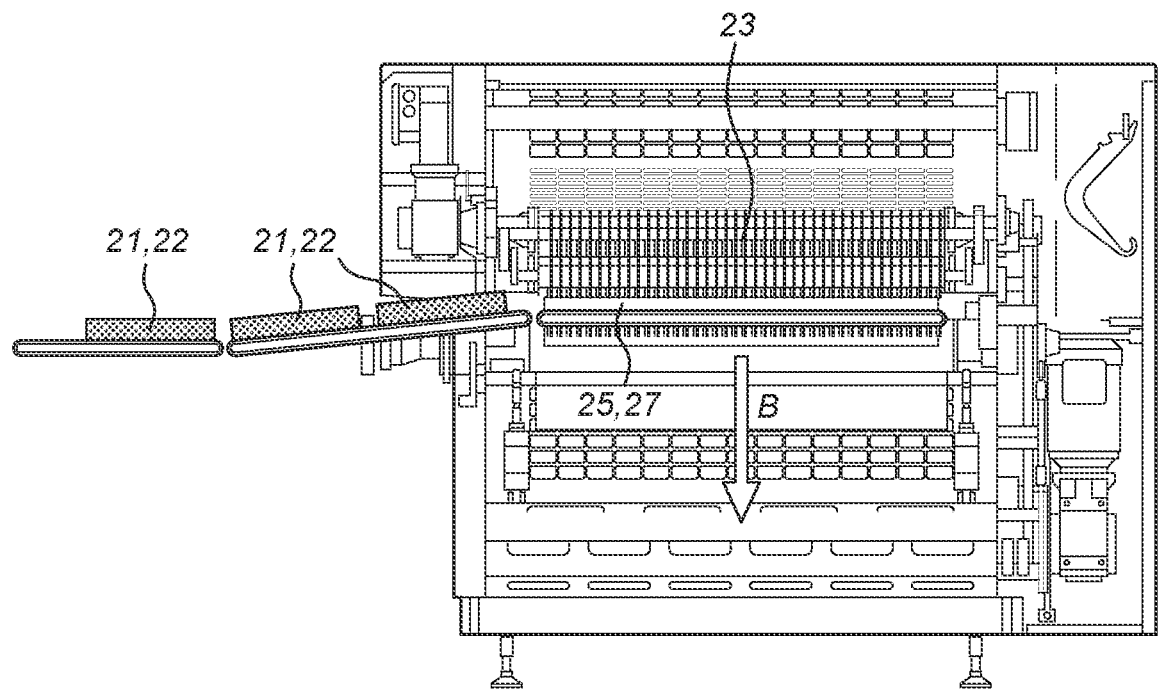
FIG. 6 shows a second detailed front view of a device according to the invention.

FIG. 6 shows such situation wherein a rejected dough piece is rerouted in a direction B to a bin, by lifting the receptacle 25 when a separator sheet with or without a dough piece to be rejected is expected.

The above figures are examples only, and in no way limiting the scope of the invention, as defined in the following claims.

The invention claimed is:

1. A device for rolling up a dough piece on a separator sheet, comprising:
 a receptacle; and
 a rolling chamber for receiving the separator sheet in flat form with the dough piece on top, and rolling up the separator sheet and the dough piece into a rolled up form, wherein the rolling chamber comprises:
  a controllable release opening for controlled transfer of the separator sheet with the dough piece in the rolled up form to the receptacle,
 characterized by:
 at least one sensor for determining directly or indirectly a closure position and/or an end of the separator sheet in the rolled up form and providing a signal representing said closure position,
 a controller for controlling the controllable release opening based on the signal from the at least one sensor; and
 the receptacle having a more or less concave cross section of its surface to provide centering properties and for receiving the separator sheet with the dough piece in the rolled up form and holding the separator sheet with the dough piece in a predetermined position.

2. The device according to claim 1, wherein the receptacle limits movement of the separator sheet with the dough piece in the rolled up form in a rolling direction that is oriented from the rolling chamber toward the receptacle.

3. The device according to claim 2, wherein the receptacle is configured for supporting the separator sheet with the dough piece in at least one location that is different from its low most point.

4. The device according to claim 3, wherein the at least one location is adjustable.

5. The device according to claim 1, wherein the receptacle transfers the separator sheet with the dough piece in the rolled up form in a direction parallel to an axis of rotation of the separator sheet with the dough piece during rolling.

6. The device according to claim 5, wherein the receptacle comprises a conveyor belt for moving the separator sheet with the dough piece in the rolled up form in the direction parallel to the axis of rotation of the separator sheet with the dough piece during rolling.

7. The device according to claim 5, coupled to, or comprising a packaging station, wherein the separator sheet with the dough piece in the rolled up form are sealed by the packaging station.

8. The device according to claim 7, wherein the separator sheet with the dough piece in the rolled up form is wrapped in paper or plastics.

9. The device according to claim 8, wherein the separator sheet with the dough piece in the rolled up form is also boxed.

10. The device according to claim 5, comprising a glue applicator that applies a stroke of glue to the separator sheet prior to further packaging.

11. The device according to claim 5, wherein the receptacle comprises a guide plate for lifting a loose end of the separator sheet to a predetermined orientation.

12. The device according to claim 5, wherein the at least one sensor includes a first sensor and a second sensor; wherein the second sensor directly or indirectly determines a completion of the rolling up of the separator sheet and the dough piece and provides directly or indirectly a signal indicating the completion of the rolling up of the dough piece and the separator sheet.

13. The device according to claim 12, wherein the controller controls the controllable release opening based on a signal from the first sensor and the second sensor.

14. The device according to claim 12, wherein the receptacle reroutes a rejected separator sheet, with or without a dough piece, to another destination than approved separator sheets with dough pieces.

15. The device according to claim 14, wherein the rejected separator sheet, with or without the dough piece, is rerouted to a bin or the like.

16. The device according to claim 15, wherein the rejected separator sheet, with or without the dough piece, is rerouted by lifting the receptacle when the rejected separator sheet with or without the dough piece is expected, or by transferring the rejected separator sheet with or without the dough piece in a direction parallel to its axis of rotation, but opposite to the direction in which the separator sheet with the dough piece are transferred.

17. The device according to claim 12, wherein the second sensor is upstream of the first sensor.

18. The device according to claim 1, wherein the predetermined position is a predetermined angular position.

19. The device according to claim 1, wherein the at least one sensor is located upstream in a transport direction of the rolling chamber and the receptacle.

20. The device according to claim 1, wherein the receptacle comprises a barrier that interferes with movement of the separator sheet with the dough piece, in the rolled up form, in a rolling direction that is oriented from the rolling chamber toward the receptacle.

* * * * *